United States Patent
Takeuchi et al.

(10) Patent No.: US 8,614,658 B2
(45) Date of Patent: Dec. 24, 2013

(54) LIQUID CRYSTAL DISPLAY

(75) Inventors: Masanori Takeuchi, Tsu (JP);
Tomokazu Ohtsubo, Suzuka (JP);
Toshihide Tsubata, Tsu (JP)

(73) Assignee: Sharp Kabushiki Kaisha, Osaka (JP)

(*) Notice: Subject to any disclaimer, the term of this patent is extended or adjusted under 35 U.S.C. 154(b) by 904 days.

(21) Appl. No.: 11/663,889

(22) PCT Filed: Oct. 4, 2005

(86) PCT No.: PCT/JP2005/018313
§ 371 (c)(1),
(2), (4) Date: Jan. 3, 2008

(87) PCT Pub. No.: WO2006/038598
PCT Pub. Date: Apr. 13, 2006

(65) Prior Publication Data
US 2008/0122772 A1    May 29, 2008

(30) Foreign Application Priority Data

Oct. 6, 2004  (JP) ................. 2004-293218

(51) Int. Cl.
*G09G 3/36*  (2006.01)
(52) U.S. Cl.
USPC ............ 345/87; 345/90; 345/92; 345/93; 349/38; 349/39; 349/41; 349/139
(58) Field of Classification Search
USPC ............ 345/87–93; 349/139–144, 38–55
See application file for complete search history.

(56) References Cited

U.S. PATENT DOCUMENTS

| | | | |
|---|---|---|---|
| 5,204,659 A | 4/1993 | Sarma | |
| 5,576,863 A | 11/1996 | Aoki et al. | |
| 6,147,722 A | 11/2000 | Shimada et al. | |
| 6,603,524 B1 | 8/2003 | Shimada et al. | |
| 6,958,791 B2 | 10/2005 | Shimoshikiryo | |
| 7,034,789 B2 | 4/2006 | Takeuchi et al. | |
| 7,098,539 B2 | 8/2006 | Gotoh et al. | |
| 7,375,773 B2 | 5/2008 | Kurihara et al. | |
| 2001/0052889 A1* | 12/2001 | Fukunishi | 345/87 |
| 2002/0047822 A1* | 4/2002 | Senda et al. | 345/90 |

(Continued)

FOREIGN PATENT DOCUMENTS

| | | |
|---|---|---|
| EP | 0 669 549 A1 | 8/1995 |
| JP | 63-21907 | 1/1988 |

(Continued)

OTHER PUBLICATIONS

EP Supplementary Search Report mailed Dec. 8, 2008 in EP application 05790494.8.

(Continued)

*Primary Examiner* — Gregory J Tryder
(74) *Attorney, Agent, or Firm* — Nixon & Vanderhye P.C.

(57) ABSTRACT

A segmented-pixel liquid crystal display has a plurality of pixels of which each has three sub-pixels 10a-10c, namely one middle and two side sub-pixels, arranged next to one another in the column or row direction. The sub-pixels 10a-10c have different brightness levels when the pixel as a whole is in a given middle halftone state, and the middle sub-pixel 10a has the highest brightness level. This eliminates unnaturalness as is conventionally produced when an image with a straight border is displayed, and further improves the gamma characteristic.

8 Claims, 7 Drawing Sheets

(56) References Cited

U.S. PATENT DOCUMENTS

| | | |
|---|---|---|
| 2002/0167477 A1 | 11/2002 | Tsutsui et al. |
| 2003/0227429 A1 | 12/2003 | Shimoshikiryo |
| 2004/0001167 A1* | 1/2004 | Takeuchi et al. ............ 349/38 |
| 2006/0023137 A1 | 2/2006 | Kamada et al. |

FOREIGN PATENT DOCUMENTS

| | | |
|---|---|---|
| JP | 06-332009 | 12/1994 |
| JP | 10-161099 A | 6/1998 |
| JP | 10-186330 | 7/1998 |
| JP | 11-242225 | 9/1999 |
| JP | 2004-029716 | 1/2004 |
| JP | 2004-062146 | 2/2004 |
| JP | 2004-078157 | 3/2004 |
| JP | 2004-214606 | 7/2004 |

OTHER PUBLICATIONS

EP Search Report mailed Dec. 3, 2008 in EP application 08013136.0.
International Search Report for PCT/JP2005/018313 mailed Nov. 8, 2005.

* cited by examiner

LIQUID CRYSTAL DISPLAY

This application is the US national phase of international application PCT/JP2005/018313 filed 4 Oct. 2005, which designated the U.S. and claims benefit of JP 2004-293218 filed 6 Oct. 2004, the entire contents of each of which are hereby incorporated by reference.

TECHNICAL FIELD

The present invention relates to liquid crystal displays, and more particularly to segmented-pixel liquid crystal displays.

BACKGROUND

Liquid crystal displays are flat displays that boast of high resolution, slimness, lightweight, low electric power consumption, and other advantages. In recent years, liquid crystal displays have seen improvement of display performance, improvement of fabrication capacity, and price competitiveness against other types of display, and accordingly they have been enjoying a rapidly growing market.

More recently, as the display quality of liquid crystal displays has been further improved, a problem in viewing angle characteristics has become apparent: the gamma characteristic varies between in orthogonal viewing and in oblique viewing; in other words, the gamma characteristic depends on the viewing angle. Here, the gamma characteristic denotes the dependence of display brightness on halftone levels. Thus, the fact that the gamma characteristic varies between in orthogonal viewing and in oblique viewing means that the way different halftone levels are displayed varies with the direction of viewing. This is annoying especially during the display of photograph images or of TV broadcasts, among others.

This problem of the viewing-angle dependence of the gamma characteristic is more remarkable in the multi-domain vertical alignment mode (MVA mode, as disclosed in JP-A-H11-242225) and in the axisymmetric aligned mode (ASM mode, as disclosed in JP-A-H10-186330) than in the in-plane switching mode (IPS mode, as disclosed in JP-B-S63-021907). On the other hand, with the IPS mode, it is more difficult, than with the MVA or ASM mode, to fabricate liquid crystal panels that offer high contrast in orthogonal viewing with satisfactory productivity. Hence, improvements addressing the viewing-angle dependence of the gamma characteristic are sought especially eagerly in MVA and ASM mode liquid crystal displays.

Under this background, the applicant previously proposed a technology whereby each pixel is segmented into two sub-pixels to which different voltages are applied to mitigate the viewing-angle dependence of the gamma characteristic (for example, in Patent Document 1 listed below).
Patent Document 1: JP-A-2004-078157, Claims
Patent Document 2: JP-A-H6-332009, Claims
Patent Document 3: JP-A-2004-062146, Embodiments Incidentally, the human eye tends to recognize pixels and borders by being attracted by light spots and areas. On the other hand, the recent trend toward increasingly large-screen liquid crystal displays has resulted in their having larger pixels than they have conventionally had. Under these circumstances, segmenting each pixel into two sub-pixels causes an inconvenience: as a result of the human eye recognizing pixels by tracing the lighter sub-pixel of each pixel, when an image with a straight border is displayed, the line of sight moves in a zigzag along the border, from one pixel with one halftone level to another having a different halftone level, often causing the viewer to perceive unsmoothness or unnatural hues. To be sure, in conventional liquid crystal displays, certain improvements have been made to address the viewing-angle dependence of the gamma characteristic; these improvements, however, are not quite satisfactory.

An object of the technology disclosed herein is to provide a segmented-pixel liquid crystal display that does not produce unnaturalness even when displaying an image with a straight border and that offers a further improved gamma characteristic.

To achieve the above object, according to one aspect of the technology disclosed herein, in a liquid crystal display, a plurality of pixels, each having a plurality of electrodes for applying an electric field to a liquid crystal layer, are arrayed in a matrix; in each pixel, three sub-pixels, namely one middle and two side sub-pixels, are arranged next to one another in the column or row direction; the three sub-pixels have at least two different brightness levels when the pixel as a whole is in a given middle halftone state, and the middle sub-pixel has the highest brightness level. In the present specification, "a middle halftone state" denotes any intermediate state between the highest and lowest halftone levels.

Here, preferably, the two side sub-pixels are given an identical brightness level.

From the viewpoint of further improving the gamma characteristic of the liquid crystal display, preferably, the ratio of the aperture area of the middle sub-pixel to the total aperture area of the two side sub-pixels is in the range from 1:1 to 1:4 and, preferably, the ratio between aperture areas of the two side sub-pixels is in the range from 1:1 to 1:4.

According to a preferred embodiment, in the liquid crystal display, preferably, the three sub-pixels each have: a liquid crystal capacitance between a sub-pixel electrode and an common electrode disposed opposite each other across the liquid crystal layer; and an auxiliary capacitance between an auxiliary capacitance electrode electrically connecting to the sub-pixel electrode and an auxiliary capacitance common electrode disposed opposite the auxiliary capacitance electrode and connecting to an auxiliary capacitance conductor. Moreover, a single electrode may be shared as the common electrodes of the three sub-pixels; moreover, at least two different auxiliary capacitance conductors may provided, one for the middle sub-pixel and another for the side sub-pixels. Here, preferably, an insulating layer is interposed between the auxiliary capacitance electrode and the auxiliary capacitance common electrode.

Preferably, there are provided: scanning lines extending in the row direction; signal lines extending in the column direction; and, for each pixel, at least two switching devices that are provided one for the middle sub-pixel and another for the side sub-pixels and that connect to a scanning line and a signal line each common to the three sub-pixels of the pixel. Moreover, preferably, the switching devices are turned on and off by a scanning signal voltage supplied to the common scanning line and, when the switching devices are on, a display signal voltage is supplied from the common signal line to the sub-pixel electrode and the auxiliary capacitance electrode of each of the middle and side sub-pixels; moreover, preferably, after the switching devices are turned off, the auxiliary capacitance common voltages at the auxiliary capacitance common electrodes of the middle and side sub-pixels vary such that the variations in those voltages as defined by the directions and degrees in which they vary differ between the middle sub-pixel and the side sub-pixels.

Here, for a higher aperture ratio, preferably, the switching devices are TFTs, and these TFTs are formed with a single semiconductor layer.

The auxiliary capacitance common voltages may invert the polarities thereof periodically. Preferably, the auxiliary capacitance common voltage applied to the auxiliary capacitance common electrode of the middle sub-pixel and the auxiliary capacitance common voltage applied to the auxiliary capacitance common electrodes of the side sub-pixels are 180 degrees out of phase with each other. Preferably, the auxiliary capacitance common voltage applied to the auxiliary capacitance common electrode of the middle sub-pixel and the auxiliary capacitance common voltage applied to the auxiliary capacitance common electrodes of the side sub-pixels have an equal amplitude.

Preferably, between every two mutually adjacent signal lines, display signal voltages applied thereto are given opposite polarities and, between every two pixels mutually adjacent in the row direction, the auxiliary capacitance electrodes and the auxiliary capacitance common electrodes of the middle and side sub-pixels are disposed in reversed patterns.

From the viewpoint of improving the aperture ration, preferably, the scanning lines are laid between mutually adjacent pixels, and, in each pixel, the two auxiliary capacitance conductors are laid parallel to the scanning lines and between the sub-pixels. Here, from the viewpoint of improving image quality, preferably, the conductor electrode via which the display signal voltage is supplied to the sub-pixel electrode of the middle sub-pixel is so formed as to cross the two auxiliary capacitance conductors.

The sub-pixel electrodes of the three sub-pixels may be separate from one another, or may be continuous with each other.

From the viewpoint of preventing disturbed alignment in the liquid crystal layer and improving display quality, preferably, a metal layer is formed under a contact hole via which the conductor electrode via which the display signal voltage is supplied connects to the sub-pixel electrode, with an insulating layer interposed between the metal layer and the contact hole.

According to the technology disclosed herein, in each pixel, three sub-pixels are formed that are arranged next to one another in the column or row direction. This helps further mitigate the viewing-angle dependence of the gamma characteristic as compared with that conventionally observed. Moreover, the three sub-pixels have at least two different brightness levels when the pixel as a whole is in a given middle halftone state, and the middle sub-pixel has the highest brightness level. Thus, even when an image with a straight border is displayed, the line of sight, as it moves along the border, moves across pixels having the same halftone level, unlike in a case where each pixel has two sub-pixels. This prevents the viewer from perceiving unsmoothness or unnatural hues at a border between different halftone levels.

Here, preferably, the two side sub-pixels are given an identical brightness level. This helps reduce the numbers of switching devices, auxiliary capacitance conductors, and other elements, and thus helps prevent undue lowering of the aperture ratio.

Preferably, the ratio of the aperture area of the middle sub-pixel to the total aperture area of the two side sub-pixels is in the range from 1:1 to 1:4 and, preferably, the ratio between aperture areas of the two side sub-pixels is in the range from 1:1 to 1:4. This helps further improve the gamma characteristic of the liquid crystal display.

Preferably, the three sub-pixels each have: a liquid crystal capacitance between a sub-pixel electrode and an common electrode disposed opposite each other across the liquid crystal layer; and an auxiliary capacitance between an auxiliary capacitance electrode electrically connecting to the pixel electrode and an auxiliary capacitance common electrode disposed opposite the auxiliary capacitance electrode and connecting to an auxiliary capacitance conductor; moreover, a single electrode may be shared as the common electrodes of the three sub-pixels; moreover, at least two different auxiliary capacitance conductors may provided, one for the middle sub-pixel and another for the side sub-pixels. This helps improve the controllability of the voltages applied to the sub-pixels.

Here, preferably, an insulating layer is interposed between the auxiliary capacitance electrode and the auxiliary capacitance common electrode. This allows those electrodes to overlap to form an auxiliary electrode, and thus helps increase the aperture ratio. Preferably, there are provided: scanning lines extending in the row direction; signal lines extending in the column direction; and, for each pixel, at least two switching devices that are provided one for the middle sub-pixel and another for the side sub-pixels and that connect to a scanning line and a signal line each common to the three sub-pixels of the pixel. Moreover, preferably, the switching devices are turned on and off by a scanning signal voltage supplied to the common scanning line and, when the switching devices are on, a display signal voltage is supplied from the common signal line to the sub-pixel electrode and the auxiliary capacitance electrode of each of the middle and side sub-pixels; moreover, preferably, after the switching devices are turned off, the auxiliary capacitance common voltages at the auxiliary capacitance common electrodes of the middle and side sub-pixels vary such that the variations in those voltages as defined by the directions and degrees in which they vary differ between the middle sub-pixel and the side sub-pixels. This helps further improve the controllability of the voltages applied to the sub-pixels.

Here, preferably, the switching devices are TFTs, and these TFTs are formed with a single semiconductor layer. This helps increase the aperture ratio of the pixel.

The auxiliary capacitance common voltages may invert the polarities thereof periodically; preferably, the auxiliary capacitance common voltage applied to the auxiliary capacitance common electrode of the middle sub-pixel and the auxiliary capacitance common voltage applied to the auxiliary capacitance common electrodes of the side sub-pixels are 180 degrees out of phase with each other; and, preferably, the auxiliary capacitance common voltage applied to the auxiliary capacitance common electrode of the middle sub-pixel and the auxiliary capacitance common voltage applied to the auxiliary capacitance common electrodes of the side sub-pixels have an equal amplitude. This helps further improve the controllability of the voltages applied to the sub-pixels.

Preferably, between every two mutually adjacent signal lines, display signal voltages applied thereto are given opposite polarities, in which case, preferably, between every two pixels mutually adjacent in the row direction, the auxiliary capacitance electrodes and the auxiliary capacitance common electrodes of the middle and side sub-pixels are disposed in reversed patterns. This allows the center sub-pixel to have the highest brightness.

Preferably, the scanning lines are laid between mutually adjacent pixels, and, in each pixel, the two auxiliary capacitance conductors are laid parallel to the scanning lines and between the sub-pixels. This helps improve the aperture ratio. Moreover, preferably, the conductor electrode via which the display signal voltage is supplied to the sub-pixel electrode of the middle sub-pixel is so formed as to cross the two auxiliary capacitance conductors. This helps cancel out the two parasitic capacitances formed where the conductor electrode crosses the auxiliary capacitance conductors, and thus helps improve image quality.

Preferably, a metal layer is formed under a contact hole via which the conductor electrode via which the display signal voltage is supplied connects to the sub-pixel electrode. This helps shield disturbed alignment in the liquid crystal layer, and thus helps improve image quality.

DETAILED DESCRIPTION

Hereinafter, liquid crystal displays embodying the technology disclosed herein will be described with reference to the accompanying drawings. It should be understood that these embodiments are not meant to limit in any way how the technology is implemented.

Figure 1:
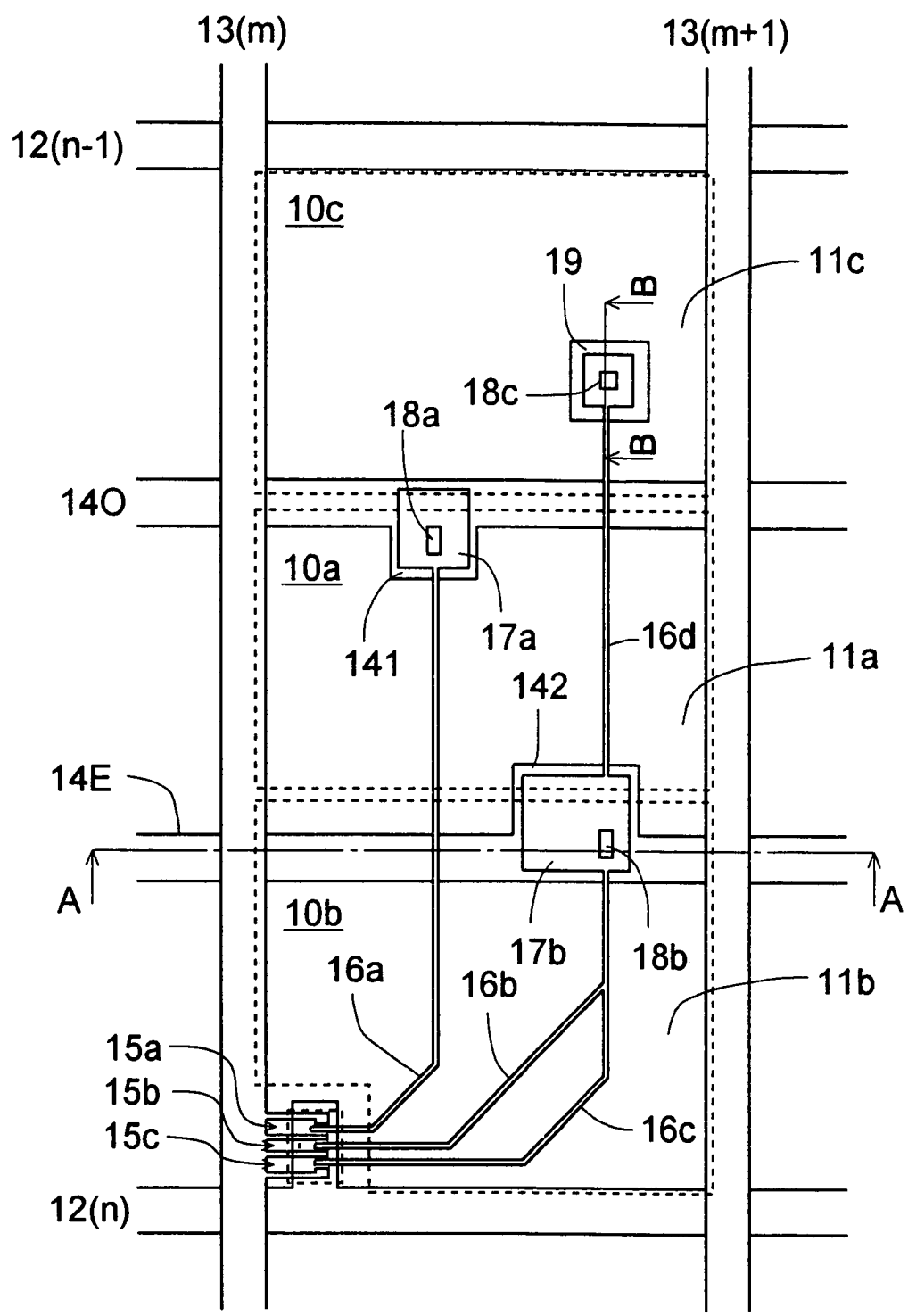
[FIG. 1] A plan view schematically showing the pixel structure in a liquid crystal display according to an example embodiment.
Figure 2:
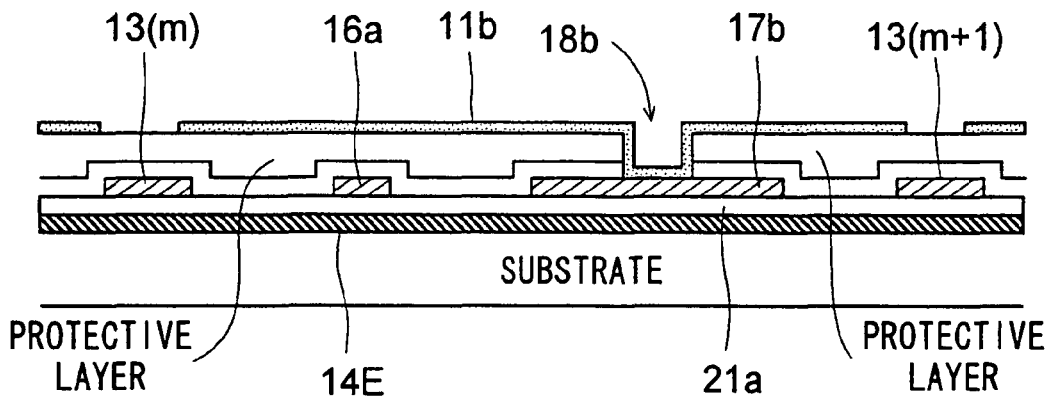
[FIG. 2] A cross-sectional view along line A-A shown in FIG. 1.
Figure 3:
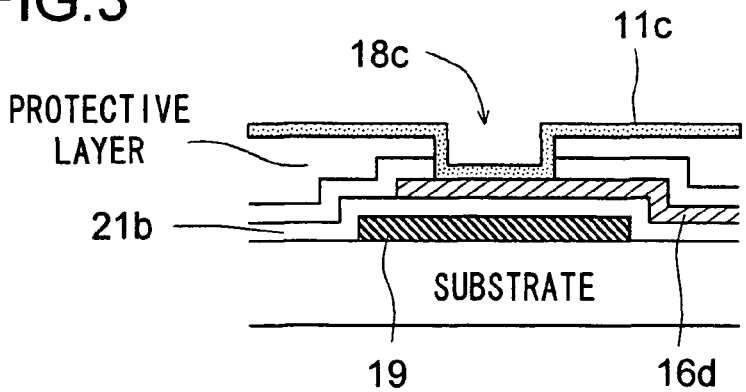
[FIG. 3] A cross-sectional view along line B-B shown in FIG. 1.

FIG. 1 is a plan view schematically showing the pixel structure on the active matrix substrate of a liquid crystal display according to the technology disclosed herein, focusing on the pixel at line n, column m. FIGS. 2 and 3 are cross-sectional view along lines A-A and B-B, respectively, shown in FIG. 1. Sub-pixel electrodes 11a-11c are arranged next to one another in the column direction. A scanning line 12(n) is laid between pixels to run laterally as seen in FIG. 1; a signal line 13(m) is laid between pixels to run longitudinally as seen in FIG. 1. Two auxiliary capacitance conductors 14O and 14E are laid parallel to the scanning line 12(n), between the sub-pixel electrodes 11a, 11b, and 11c. As switching devices, TFTs 15a-15c are provided at the intersection between the scanning line 12(n) and the signal line 13(m).

A drain electrode extension 16a from the TFT 15a runs over the auxiliary capacitance conductor 14E to reach above the auxiliary capacitance conductor 14O, where a portion of the drain electrode extension 16a faces, across an insulating layer (unillustrated), an auxiliary capacitance common electrode 141 formed integrally with the auxiliary capacitance conductor 14O to function as an auxiliary capacitance electrode 17a. In this auxiliary capacitance electrode 17a, a contact hole 18a is formed to connect the drain electrode extension 16a to the sub-pixel electrode 11a. Likewise, drain electrode extensions 16b and 16c merge together on the way to reach above the auxiliary capacitance conductor 14E, where a portion of the drain electrodes extension 16b and 16c faces, across an insulating layer (unillustrated), an auxiliary capacitance common electrode 142 formed integrally with the auxiliary capacitance conductor 14E to function as an auxiliary capacitance electrode 17b. In this auxiliary capacitance electrode 17b, a contact hole 18b is formed to connect the drain electrodes extension 16b and 16c to the sub-pixel electrode 11b (see FIG. 2). From the auxiliary capacitance electrode 17b, a drain electrode extension 16d further extends to run over the auxiliary capacitance conductor 14O to reach above the sub-pixel electrode 11c, where the drain electrode extension 16d connects via a contact hole 18c to the sub-pixel electrode 11c (see FIG. 3).

As shown in FIGS. 2 and 3, under the contact hole 18b, the auxiliary capacitance conductor 14E is formed with an insulating layer 21a interposed in between; under the contact hole 18c, a metal layer 19 forming an island is formed with an insulating layer 21b interposed in between. This helps shield disturbed alignment in the liquid crystal layer, and thus helps improve image quality. The insulating layer 21a, which forms an auxiliary capacitance, and the insulating layer 21b under the contact hole 18c are each, for example, the gate insulating layer of a TFT.

With this structure, an equal effective voltage is applied to the sub-pixel electrodes 11b and 11c. Moreover, as will be described later, by supplying different auxiliary capacitance common voltages to the two auxiliary capacitance conductors 14O and 14E, it is possible to make the effective voltage at the sub-pixel electrode 11a higher than the effective voltage at the sub-pixel electrodes 11b and 11c. Thus, it is possible to make the brightness level of a sub-pixel 10a higher than the brightness level of sub-pixels 10b and 10c. This helps eliminate unnaturalness as is conventionally produced when an image with a straight border is displayed, and also helps further mitigate the viewing-angle dependence of the gamma characteristic.

Figure 4:
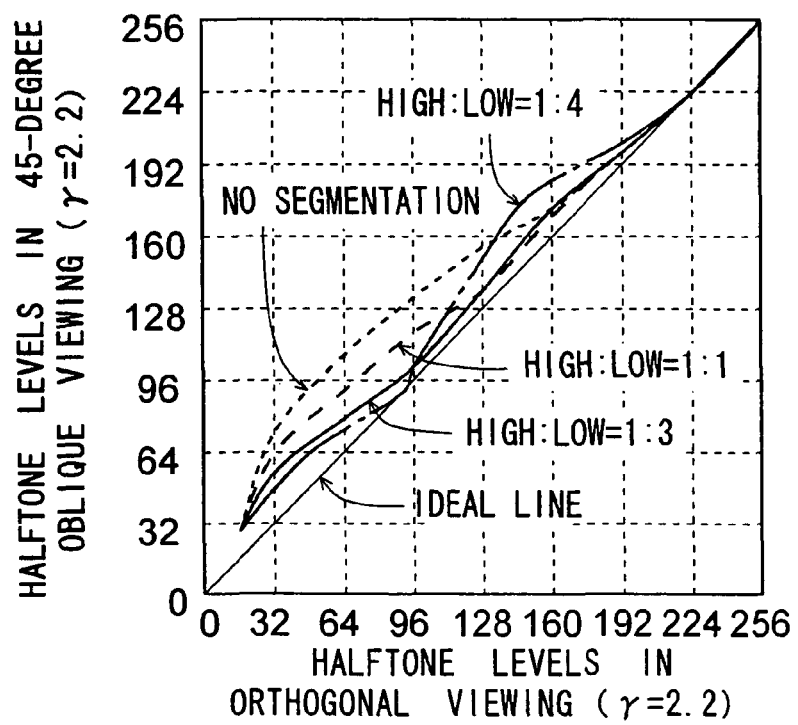
[FIG. 4] A graph showing the viewing-angle dependence of the gamma characteristic in relation to the ratio of the aperture area of the middle sub-pixel to the ratio of the total aperture area of the side sub-pixels.

Through experiments, the applicant has come to know that an effective way to mitigate the viewing-angle dependence of the gamma characteristic is to reduce the proportion of the aperture area of the sub-pixel 10a that has a higher brightness level. In FIG. 4 is a graph showing the viewing-angle dependence in relation to the ratio of the aperture area of the higher-brightness sub-pixel 10a (indicated as "high" in the graph) to the total aperture area of the lower-brightness sub-pixels 10b and 10c (indicated as "low" in the graph). In FIG. 4, the horizontal axis represents the halftone level observed in orthogonal viewing, and the vertical axis represents the viewing-angle dependence of the gamma characteristic observed at different aperture area ratios, namely "with no pixel segmentation", "at a high-to-low ratio of 1:1", "at a high-to-low ratio of 1:3", and "at a high-to-low ratio of 1:4", by using the halftone level observed in oblique viewing from 45 degrees upward, downward, leftward, and rightward. This graph shows the following. As the proportion of the "high" brightness aperture area decreases, the gamma characteristic becomes increasingly close to the ideal straight line, becoming closest to it when the high-to-low ratio is 1:3; as the "high" brightness aperture area further decreases (to 1:4), the gamma characteristic then becomes increasingly less close to the ideal straight line. Hence, the ratio of the aperture area of the higher brightness sub-pixel 10a to the total aperture area of the lower sub-pixels 10b and 10c is preferably in the range between 1:1 to 1:4, and further preferably in the range between 1:2.5 to 1:3.5. Incidentally, the relationship between, on one hand, the just mentioned viewing-angle dependence of the gamma characteristic in relation to the aperture area ratio and, on the other hand, transmissivity is explained in JP-A-2004-062146, a prior application by the same applicant.

Moreover, the ratio between the aperture areas of the sub-pixels 10b and 10c is preferably in the range from 1:1 to 1:4, and further preferably in the range from 1:1 to 1:2. With the higher-brightness sub-pixel located in a deviated position, an evaluation of the display quality of an image of a person revealed an unintended change in color at the border of a skin-color area, like where a skin-color area, such as representing the chin of a person, overlaps a single-color background, such as clothes. This phenomenon was alleviated when the higher-brightness sub-pixel was located closer to the center.

Figure 5:
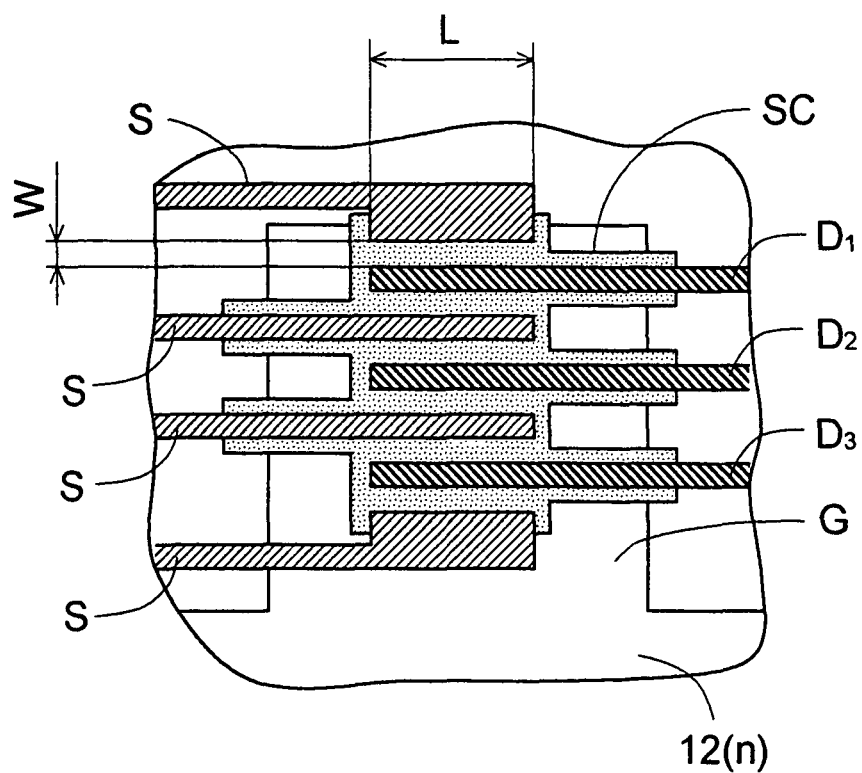
[FIG. 5] An enlarged plan view of the TFTs shown in FIG. 1.

In the embodiment under discussion, TFTs (thin-film transistors) are used as switching devices. FIG. 5 is an enlarged view of the TFTs in the liquid crystal display shown in FIG. 1. On top of a gate electrode G formed as part of the scanning line 12(n), a gate insulating film (unillustrated) is formed, and, further on top, a semiconductor layer SC is formed. On top of this semiconductor layer SC, a source electrode S and three drain electrodes $D_1$, $D_2$, and $D_3$ are formed. From the source electrode S, a plurality of extensions extend substantially in the shape of a comb. The drain electrodes $D_1$, $D_2$, and $D_3$ are formed between these extensions, with a predetermined distance secured from them.

Forming the three TFTs 15a to 15c on a single semiconductor layer SC in this way helps give the pixel a larger aperture ratio than when they are formed separately. Moreover, by varying the width W and length L of the channel regions formed between the extensions of the source electrode S and the drain electrodes $D_1$, $D_2$, and $D_3$, it is possible to supply the desired current that suits the capacity of the pixel.

There are no particular restrictions on the shapes of the source electrode S, the drain electrodes $D_1$, $D_2$, and $D_3$, and the semiconductor layer SC; these may be given any shapes so long as no current leakage occurs. As switching devices, any conventionally known switching devices other than TFTs may instead be used, such as MIMs (metal insulator metals).

Figure 6:
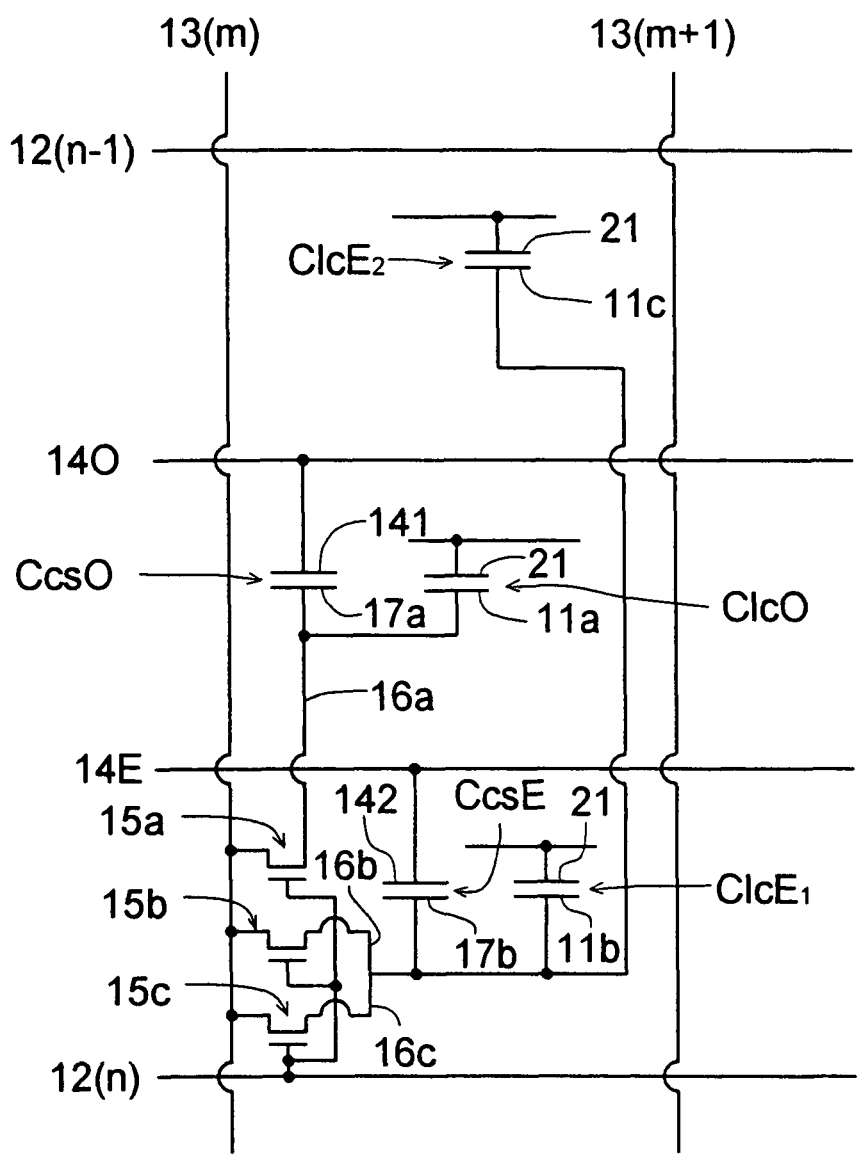
[FIG. 6] A circuit diagram electrically equivalent to the pixel structure in the liquid crystal display shown in FIG. 1.

FIG. 6 is a schematic diagram showing a circuit equivalent to the liquid crystal display shown in FIG. 1. In this diagram, the liquid crystal capacitance corresponding to the sub-pixel 10a is indicated as ClcO, and the liquid crystal capacitances corresponding to the sub-pixels 10b and 10c is indicated as $ClcE_1$ and $ClcE_2$. The liquid crystal capacitances ClcO, $ClcE_1$, and $ClcE_2$ of the sub-pixels 10a, 10b, and 10c are formed by the sub-pixel electrodes 11a to 11c, a common electrode 21, and the liquid crystal layer lying in between. The sub-pixel electrodes 11a to 11c are connected via the TFTs 15a to 15c to the signal line 13(m), and the gate electrode G (shown in FIG. 5) of the TFTs is connected to the scanning line 12(n)

A first auxiliary capacitance provided for the sub-pixel 10a and a second auxiliary capacitance provided for the sub-pixels 10b and 10c are indicated as CcsO and CscE in FIG. 6. The auxiliary capacitance electrode 17a of the first auxiliary capacitance CcsO is connected via the drain electrode extension 16a to the drain of the TFT 15a. The auxiliary capacitance electrode 17b of the second auxiliary capacitance CcsE is connected via the drain electrode extensions 16b and 16c to the drains of the TFTs 15b and 15c. The auxiliary capacitance electrodes 17a and 17b may be connected in any manner other than specifically illustrated, so long as they are electrically so connected as to receive voltages equal to those applied to the corresponding sub-pixel electrodes, namely the sub-pixel electrode 11a and the sub-pixel electrodes 11b and 11c, respectively; that is, the sub-pixel electrode 11a and the sub-pixel electrodes 11b and 11c have simply to be electrically connected, either directly or indirectly, to the corresponding auxiliary capacitance electrodes 17a and 17b, respectively.

The auxiliary capacitance common electrode 141 of the first auxiliary capacitance CcsO is connected to the auxiliary capacitance conductor 140, and the auxiliary capacitance common electrode 142 of the second auxiliary capacitance CcsE is connected to the auxiliary capacitance conductor 14E. With this structure, it is possible to apply different auxiliary capacitance common voltages to the auxiliary capacitance common electrodes 141 and 142 of the first and second auxiliary capacitance CcsO and CcsE, respectively. As will be described later, how the auxiliary capacitance common electrodes 141 and 142 are connected to the first and second auxiliary capacitances CcsO and CcsE is selected to suit the driving method adopted (for example, dot-inversion driving).

Next, a description will be given of the mechanism by which different voltages are applied, on one hand, to the sub-pixel electrode 11a and, on the other hand, to the sub-pixel electrodes 11b and 11c.

Figure 7:
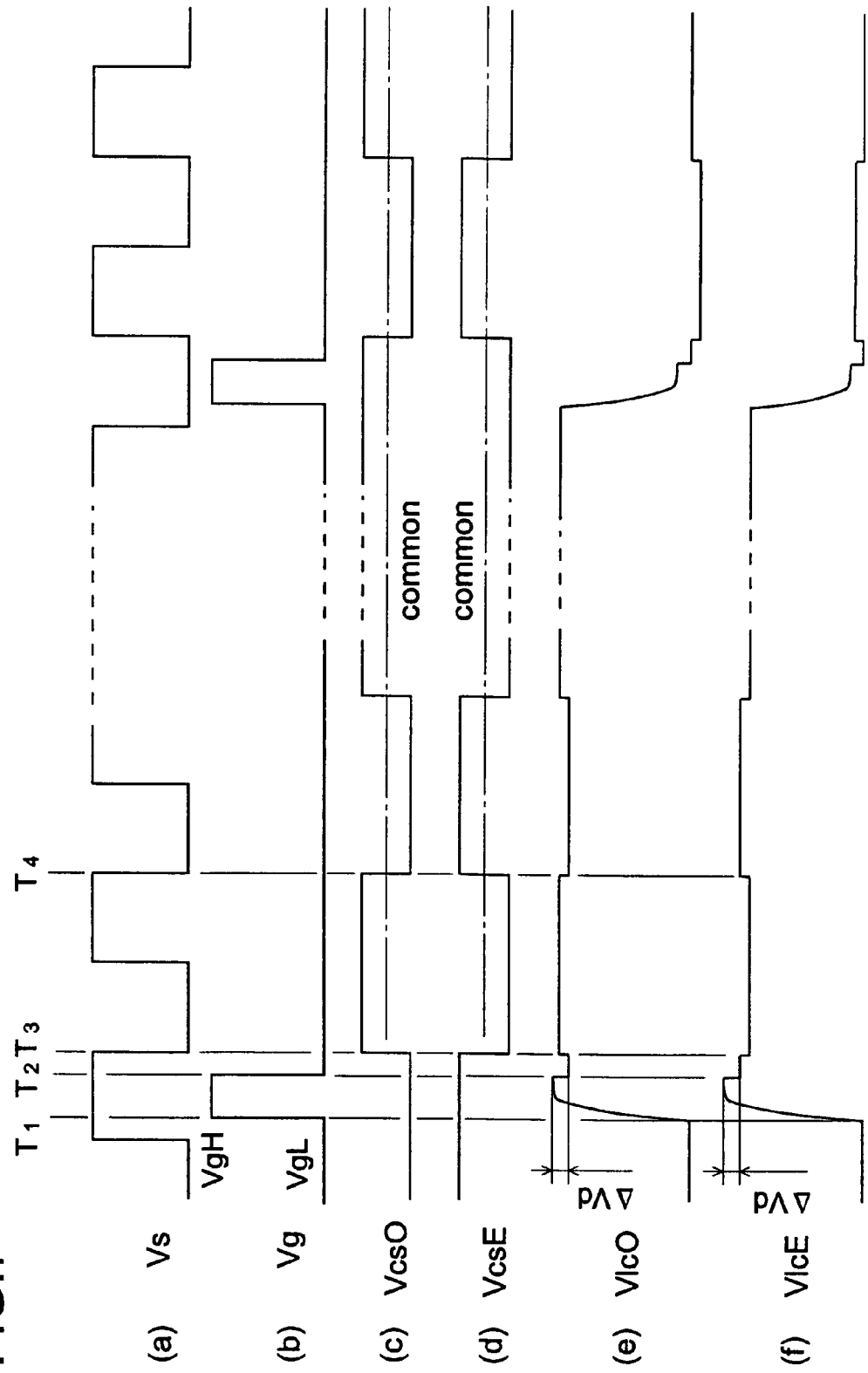
[FIG. 7] A diagram schematically showing an example of the voltage waveforms with which the liquid crystal display according to an example embodiment is driven.

FIG. 7 shows the voltage waveforms of the signals fed to the pixel (n, m) shown in FIG. 6; that is, it shows how those signals change their voltage levels over time. In FIG. 7, at (a) is shown the waveform of the display signal voltage (halftone signal voltage) Vs supplied to a signal line 13; at (b) is shown the waveform of the scanning signal voltage Vg supplied to a scanning line 12; at (c) and (d) are shown the waveforms of the auxiliary capacitance common voltages VcsO and Vcse supplied to the auxiliary capacitance conductors 14O and 14E, respectively; at (e) and (f) are shown the waveforms of the voltages VlcO and VlcE applied to the liquid crystal capacitances $ClcE_1$ and $ClcE_2$ of the sub-pixel 10a and of the sub-pixels 10b and 10c, respectively.

The driving method shown in FIG. 7 is adopted when the technology disclosed herein is applied to a liquid crystal display that operates on a "1H dot inversion plus frame inversion" basis.

The display signal voltage Vs applied to a signal line 13 inverts its polarity every time a scanning line is selected (every 1H); in addition, between every two mutually adjacent signal lines, the display signal voltages applied thereto have opposite polarities (1H inversion). Moreover, the display signal voltages Vs on all the signal lines 13 invert their polarities every frame (frame inversion).

In the example under discussion, the cycle at which the auxiliary capacitance common voltages VcsO and Vcse invert their polarities is 2H; moreover, the auxiliary capacitance common voltages VcsO and Vcse have waveforms such that they have an equal amplitude and are 180 degrees out of phase with each other. The cycle at which the auxiliary capacitance common voltages VcsO and Vcse invert their polarities may be longer than 2H.

Now, with reference to FIG. 7, a description will be given of why the voltages VlcO and VlcE applied to the liquid crystal capacitance ClcO and to the liquid crystal capacitances $ClcE_1$ and $ClcE_2$ change their voltage levels as shown in FIG. 7.

At time $T_1$, the scanning signal voltage Vg turns from low (VgL) to high (VgH), and thereby brings the TFTs 15a to 15c into a conducting state, allowing the display signal voltage Vs on the signal line 13 to be applied to the sub-pixel electrodes 10a to 10c. The voltages applied across the liquid crystal capacitance ClcO and across the liquid crystal capacitances $ClcE_1$ and $ClcE_2$ are the differences between the voltages at the sub-pixel electrodes 11a to 11c and the voltage (Vcom) at the common electrode 21. That is, VlcO=VlcE$_1$=VlcE$_2$=Vs−Vcom.

At time T$_2$, the scanning signal voltage Vg turns from high (VgH) to low (VgL, <Vs), and thereby brings the TFTs 15a to 15c into a non-conducting state (off state), electrically insulating all the sub-pixels and the auxiliary capacitances from the signal line 13. At this point, under the influence of the parasitic capacitances etc. of the TFTs 15a to 15c, the voltages at the sub-pixel electrodes 11a to 11c momentarily fall by ΔVd, a phenomenon called "pulling".

At time T$_3$, the voltage VlcO at the liquid crystal capacitance ClcO changes under the influence of the voltage VcsO at the auxiliary capacitance common electrode 141 of the auxiliary capacitance CcsO, which electrode is electrically connected to the sub-pixel electrode 11a of the liquid crystal capacitance ClcO. Moreover, the voltage VlcE at the liquid crystal capacitances ClcE$_1$ and ClcE$_2$ changes under the influence of the voltage VcsE at the auxiliary capacitance common electrode 142 of the second auxiliary capacitance CcsE, which electrode is electrically connected to the sub-pixel electrodes 11b and 11c of the liquid crystal capacitances ClcE$_1$ and ClcE$_2$.

Here, suppose that, at time T$_3$, the auxiliary capacitance common voltage VcsO increases by VcsOp>0 and the auxiliary capacitance common voltage VcsE decreases by VcsEp>0. That is, let the whole amplitude Vp−p of the auxiliary capacitance common voltage VcsO be VcsOp, and let the whole amplitude of the auxiliary capacitance common voltage VcsE be VceEp.

Moreover, let the total capacitance of the liquid crystal capacitance ClcO and the auxiliary capacitance CcsO be $C_{pix}O$, and let the total capacitance of the liquid crystal capacitances ClcE$_1$ and ClcE$_2$ and the auxiliary capacitance CcsE be $C_{pix}E$. Then, $$VlcO = Vs - \Delta Vd + VcsOp(CcsO/C_{pix}O) - Vcom, \text{ and}$$

$$VlcE = Vs - \Delta Vd + VcsEp(CcsE/C_{pix}E) - Vcom.$$

Next, at time T$_4$, likewise under the influence of the voltages VcsO and VceE at the auxiliary capacitance common electrodes, the voltages VlcO and VlcE restore their voltages at time T$_2$.

$$VlcO = Vs - \Delta Vd - Vcom, \text{ and}$$

$$VlcE = Vs - \Delta Vd - Vcom.$$

These changes in voltage are repeated until the voltage Vg(n) turns to VgH in the next frame. As a result, the voltages VlcO and VlcE come to have different effective values. Specifically, let the effective value of the voltage VlcO be VlcO$_{rms}$, and let the effective value of the voltage VlcE be VlcE$_{rms}$, then $$VlcO_{rms} = Vs - \Delta Vd + (\tfrac{1}{2})VcsOp(CcsO/C_{pix}O) - Vcom,$$
and $$VlcE_{rms} = Vs - \Delta Vd - (\tfrac{1}{2})VcsEp(CcsE/C_{pix}E) - Vcom$$

(provided that (Vs−ΔVd−Vcom)>>VcsOp ($CcsO/C_{pix}O$), and
(Vs−ΔVd−Vcom)>>VcsEp($CcsE/C_{pix}E$)).
Hence, let the differences between these effective values be ΔVlc=VlcO$_{rms}$−VlcE$_{rms}$, then $$\Delta Vlc = [VcsOp(CcsO/C_{pix}O) + VcsEp(CcsE/C_{pix}E)]/2.$$

In this way, by controlling the voltages applied to the auxiliary capacitance common electrodes 141 and 142 of the auxiliary capacitances CcsO and CcsE connected to the sub-pixel electrodes 11a to 11c, it is possible to apply different voltages to the sub-pixel electrode 11a and to the sub-pixel electrodes 11b and 11c.

By interchanging the voltages VcsO and VcsE, it is possible to give the voltage VlcO a smaller effective value and the voltage VlcE a greater effective value. Alternatively, also by reversing the combination of the auxiliary capacitance conductors 14O and 14E connected to the auxiliary capacitance common electrodes 141 and 142 of the auxiliary capacitances CcsO and CcsE, it is possible to give the voltage VlcO a smaller effective value and the voltage VlcE a greater effective value.

Here, since the driving method adopted involves frame inversion, in the next frame, the polarity of the voltage Vs is inverted, so that Vlc<0. Even then, the same results as described above can be obtained by inverting the polarities of VcsO and VcsE in synchronism with frame inversion.

Figure 8:
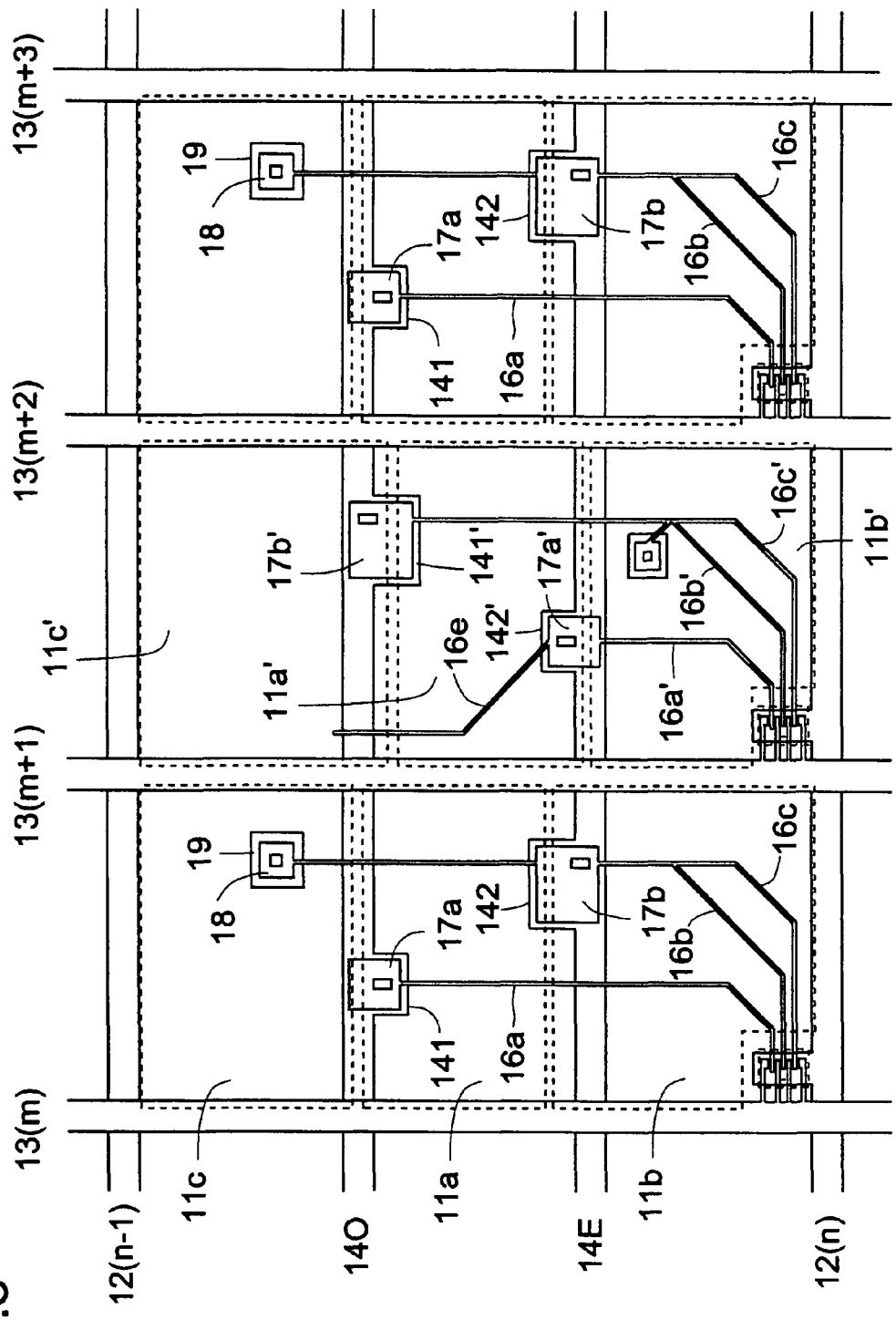
[FIG. 8] A plan view schematically showing the pixel structure in another example embodiment of a liquid crystal display.

Moreover, here, since the driving method adopted involves dot inversion, between every two mutually adjacent signal lines 13(m) and 13(m+1), the display signal voltages supplied thereto have opposite polarities. Thus, to make the effective voltage applied to the sub-pixel electrode 11a' always higher than the effective voltage applied to the sub-pixel electrodes 11b' and 11c' even in the pixel (n, m+1) in the next frame, as shown in FIG. 8, it is necessary that the auxiliary capacitance electrode 17a' of the sub-pixel electrode 11a' face the auxiliary capacitance common electrode 142' of the auxiliary capacitance conductor 14E and that the auxiliary capacitance electrode 17b' of the sub-pixel electrodes 11b' and 11c' face the auxiliary capacitance common electrode 141' of the auxiliary capacitance conductor 140.

Here, in the pixel (n, m), since the drain electrode extension 16a of the sub-pixel electrode 11a crosses the two auxiliary capacitance conductors 14O and 14E, and the voltages applied to the auxiliary capacitance conductors 14O and 14E are 180 degrees out of phase with each other, the parasitic capacitances attributable to the drain electrode extension 16a and attributable to the auxiliary capacitance conductors 14O and 14E cancel out. On the other hand, in the pixel (n, m+1), although the drain electrode extension 16a' of the sub-pixel electrode 11a' does not need to cross the auxiliary capacitance conductor 140, if the drain electrode extension 16a' of the sub-pixel electrode 11a' crosses only the auxiliary capacitance conductor 14E, the above-mentioned parasitic capacitances do not cancel out, and cause uneven display between the sub-pixel electrodes 11a and 11a'. To overcome this inconvenience, it is recommended that a drain electrode extension 16e be formed to extend further from the auxiliary capacitance electrode 17a' of the sub-pixel electrode 11a' to reach above the auxiliary capacitance conductor 140 so that together the drain electrode extensions cross the two auxiliary capacitance conductors 14O and 14E.

Figure 9:
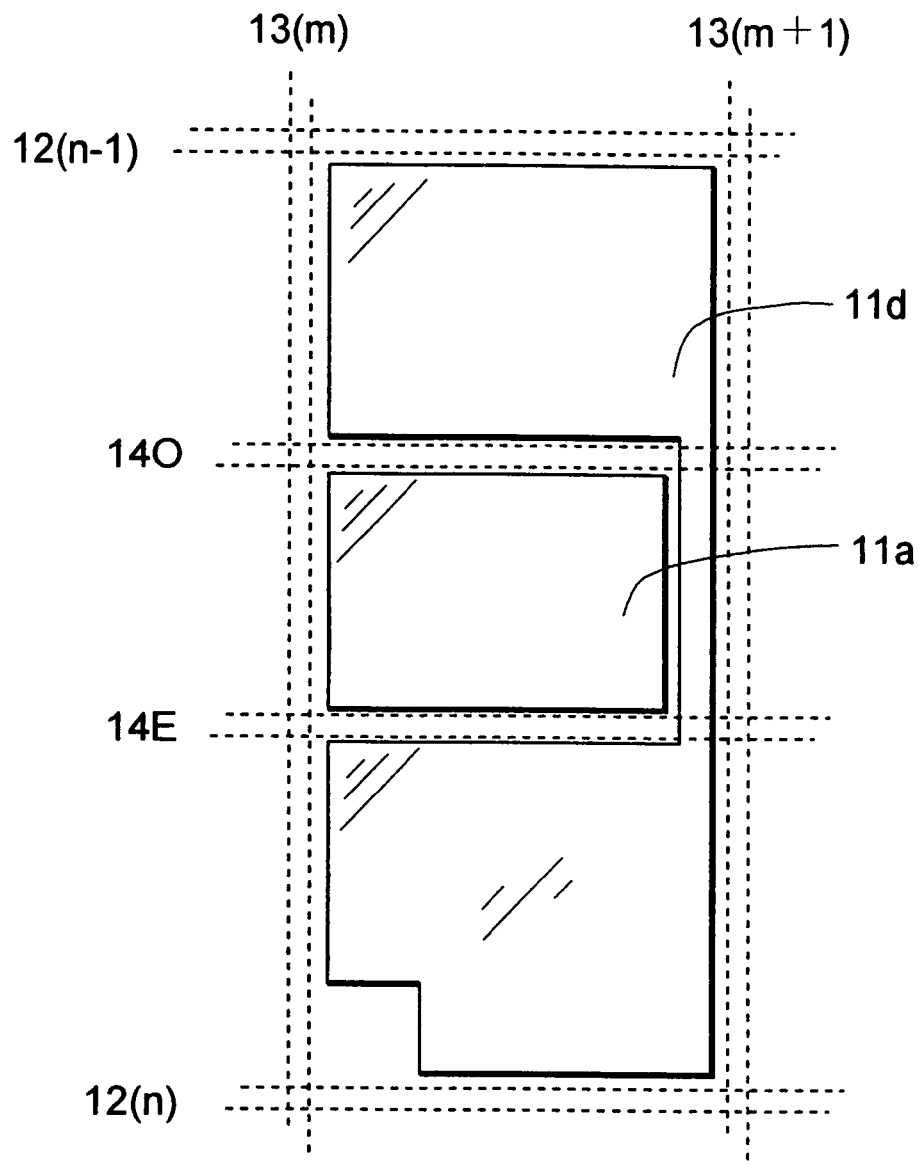
[FIG. 9] A plan view schematically showing another example of the sub-pixel electrodes usable in an example embodiment of the technology disclosed herein.

In the liquid crystal display described above, the sub-pixel electrodes 11a to 11c of the sub-pixels 10a to 10c are formed separately from one another (see FIG. 1); it is however also possible to form the sub-pixel electrodes 11b and 11c as a single sub-pixel electrode 11d as shown in FIG. 9. Even in that case, just as described previously, by controlling the voltages applied to the auxiliary capacitance common electrodes 141 and 142 connected to the sub-pixel electrodes 11a and 11d, it is possible to apply different voltages to the sub-pixel electrodes 11a and 11d. In the liquid crystal display described above, the sub-pixels are arranged next to one another in the column direction; needless to say, it is also possible to arrange them in the row direction instead.

The embodiment described above demonstrates that the technology disclosed herein contributes to improving the gamma characteristic in normally black mode liquid crystal displays, in particular MVA mode liquid crystal displays. It should however be understood that the technology disclosed herein finds application in any other type of liquid crystal display, among others, IPS liquid crystal displays Liquid crystal displays according to the technology disclosed herein offer an improved gamma characteristic with less viewing angle dependence than ever, and do not produce unsmoothness or unnatural hues along a border even when an image with a straight border is displayed. This makes liquid crystal displays according to the invention suitable for use in, for example, television monitors with large screens.

The invention claimed is:

1. A liquid crystal display comprising:
    a pixel area comprising a first sub-pixel electrode and a second sub-pixel electrode;
    a first switching device and a second switching device each connected to a signal line and a common scanning line;
    the first switching device is connected to the first sub-pixel electrode,
    the second switching device is connected to the second sub-pixel electrode,
    a first auxiliary capacitance conductor and a second auxiliary capacitance conductor provided at least partially in the pixel area and extending substantially parallel to the scanning line;
    a connection line configured to connect the first sub-pixel electrode to the first switching device and to extend over both of the first auxiliary capacitance conductor and the second auxiliary capacitance conductor;
    wherein the connection line comprises a first width connection line segment and a wider width connection line segment which is wider than the first width connection line segment, and wherein the wider width connection line segment extends over at least a portion of the second auxiliary capacitance conductor; and
    wherein the wider width segment comprises a conductive layer which connects to the second sub-pixel electrode.

2. The liquid crystal display of claim 1, wherein at least one of the first auxiliary capacitance conductor and the second auxiliary capacitance conductor is spaced away from an edge of the pixel area in a direction perpendicular to the scanning line.

3. The liquid crystal display of claim 2, wherein at least a portion of the second auxiliary capacitance conductor is spaced away from an edge of the second sub-pixel electrode in a direction perpendicular to the scanning line.

4. The liquid crystal display of claim 1, wherein both the first auxiliary capacitance conductor and the second auxiliary capacitance conductor are provided intermediate the scanning line and an adjacent scanning line.

5. The liquid crystal display of claim 1, wherein the connection line comprises a conductive layer which extends over the second auxiliary capacitance conductor and connects to the second sub-pixel electrode.

6. The liquid crystal display of claim 1, wherein the second auxiliary capacitance conductor comprises a normal width capacitance conductor segment and a wider width capacitance conductor segment which is wider than the first width capacitance conductor segment, the wider width capacitance conductor segment having a greater footprint in the pixel area than the wider width connection line segment.

7. The liquid crystal display of claim 1, wherein at least one of the first sub-pixel electrode and the second sub-pixel electrode connect to the connection line through a contact hole.

8. The liquid crystal display of claim 1, wherein an overlap of both of the first auxiliary capacitance conductor and the second auxiliary capacitance conductor by the connection line is between the first switching device and a contact hole of the first sub-pixel electrode.

* * * * *